(12) United States Patent
Shen et al.

(10) Patent No.: US 10,019,844 B1
(45) Date of Patent: Jul. 10, 2018

(54) DISPLAY NON-UNIFORMITY CALIBRATION FOR A VIRTUAL REALITY HEADSET

(71) Applicant: Oculus VR, LLC, Menlo Park, CA (US)

(72) Inventors: Shizhe Shen, San Mateo, CA (US); Evan Mark Richards, Santa Clara, CA (US)

(73) Assignee: Oculus VR, LLC, Menlo Park, CA (US)

( * ) Notice: Subject to any disclaimer, the term of this patent is extended or adjusted under 35 U.S.C. 154(b) by 288 days.

(21) Appl. No.: 14/969,354

(22) Filed: Dec. 15, 2015

(51) Int. Cl.
| | |
|---|---|
| *G09G 3/00* | (2006.01) |
| *G06T 19/00* | (2011.01) |
| *G09G 5/14* | (2006.01) |
| *G09G 3/20* | (2006.01) |
| *G09G 3/34* | (2006.01) |
| *G06T 19/20* | (2011.01) |
| *G06T 5/00* | (2006.01) |

(52) U.S. Cl.
CPC ............ *G06T 19/006* (2013.01); *G06T 5/009* (2013.01); *G06T 19/20* (2013.01); *G09G 3/003* (2013.01); *G09G 3/2003* (2013.01); *G09G 3/2074* (2013.01); *G09G 3/2085* (2013.01); *G09G 3/3426* (2013.01); *G09G 5/14* (2013.01); *G06T 2219/2012* (2013.01); *G09G 2320/0233* (2013.01); *G09G 2320/062* (2013.01); *G09G 2320/0686* (2013.01); *G09G 2320/0693* (2013.01)

(58) Field of Classification Search
None
See application file for complete search history.

(56) References Cited

U.S. PATENT DOCUMENTS

| | | | | |
|---|---|---|---|---|
| 2008/0062164 | A1* | 3/2008 | Bassi ................... | H04N 9/3147 345/214 |
| 2010/0060911 | A1* | 3/2010 | Marcu ..................... | G09G 5/02 358/1.9 |
| 2011/0148904 | A1* | 6/2011 | Kotani ..................... | H04N 9/31 345/589 |
| 2011/0227964 | A1* | 9/2011 | Chaji ..................... | G09G 3/006 345/690 |

(Continued)

*Primary Examiner* — Ryan M Gray
(74) *Attorney, Agent, or Firm* — Fenwick & West LLP (57) ABSTRACT

An electronic display is driven to compensate for non-uniformity in a display property across display regions of the electronic display. Non-uniformity measures are determined for a set of electronic displays. A transformation is determined for converting the non-uniformity measures to transformed non-uniformity representations having fewer dimensions than a total number of the display regions in an electronic display. Using the transformation, a transformed non-uniformity representation for the electronic display is generated and stored, and an inverse transform is determined and stored. A system containing the electronic display generates correction values for the display regions by applying the inverse transformation to the transformed non-uniformity representation. Input display data for the electronic display is modified according to the generated correction values for the display regions. The electronic display is driven according the modified display data.

20 Claims, 7 Drawing Sheets

(56) References Cited

U.S. PATENT DOCUMENTS

| | | | |
|---|---|---|---|
| 2011/0298763 A1* | 12/2011 | Mahajan | G09G 3/025 345/207 |
| 2012/0038660 A1* | 2/2012 | Han | G09G 3/2003 345/590 |
| 2012/0299973 A1* | 11/2012 | Jaffari | G09G 3/3208 345/690 |
| 2015/0062000 A1* | 3/2015 | Saito | G02B 27/017 345/156 |

* cited by examiner

DISPLAY NON-UNIFORMITY CALIBRATION FOR A VIRTUAL REALITY HEADSET

BACKGROUND

The present disclosure generally relates to display devices and, more particularly, to correcting non-uniformities in pixels of an electronic display.

Virtual reality (VR) systems typically include an electronic display that presents virtual reality images. The electronic display includes pixels that display a portion of an image by emitting one or more wavelengths of light from one or more subpixels. During the manufacturing process, various factors cause non-uniformities in luminance of pixels and subpixels. For example, variations in flatness of a carrier substrate, variations in a lithography light source, temperature variations across the substrate, or mask defects may result in the electronic display having transistors with non-uniform emission characteristics. As a result, different subpixels driven with the same voltage and current will emit different intensities of light. Variations that are a function of position on the electronic display cause different display regions of the electronic display to have different luminance. If these errors systematically affect subpixels of one color more than subpixels of another color, then the electronic display has non-uniform color balance as well. These spatial non-uniformities decrease image quality and immersion in a virtual reality environment.

SUMMARY

To improve image quality across an electronic display, a VR system includes a display calibration unit to compensate for non-uniformity of the pixels and subpixels. In general, a display calibration system measures non-uniformity in a display property across display regions of a set of electronic displays. The display calibration system generates a condensed representation of the non-uniformity measures and stores the condensed representation in a memory of the electronic display. A VR system accesses the non-uniformity representation to calibrate the electronic display. The condensed representation has reduced dimensionality relative to the non-uniformity measures, so the condensed representation reduces memory used to store calibration data on the electronic display.

In general, a display calibration system measures non-uniformity in a display property such as luminance or color balance among display regions of a set of electronic displays. The display regions are contiguous sets of pixels defined consistently across the set of electronic displays. For example, the electronic display is divided into a grid of regions having sixty rows and sixty columns. Example sets of electronic displays include electronic displays from a particular manufacturer, from a particular factory, or from a particular manufacturing batch. The display calibration system measures a display property across display regions of an electronic display and determines non-uniformity measures for the display regions relative to an overall average of the display property.

The display calibration system performs statistical analysis on the non-uniformity measures for the set of electronic displays to generate a transformation that reduces the dimensionality of the non-uniformity measures. By applying the transformation to the non-uniformity measures of a particular electronic display, the display calibration system generates a non-uniformity representation. For example, the non-uniformity measures of an electronic display have a few thousand entries (one for each display region), and the corresponding non-uniformity representation has three to ten entries. The display calibration system stores the non-uniformity representation in a register, cache, or other memory of the electronic display. Storing the non-uniformity measures could entail a dedicated register or other memory on the electronic display, which would increase manufacturing cost. Because the non-uniformity representation has a relatively small number of entries, the non-uniformity representation can be stored in a general purpose register or existing memory holding other calibration data. Thus, the non-uniformity representation reduces the amount of memory on the electronic display, which reduces manufacturing cost, device weight, and device power consumption.

The VR system calibrates the electronic display using the non-uniformity representation. The VR system generates correction values for the display regions from the non-uniformity representation using an inverse transformation that corresponds to the set of electronic displays. The VR system retrieves the inverse transformation from cloud storage or a memory of the VR system. Using the correction values, the VR system calibrates the display regions of the electronic display. Accordingly, the VR system may reduce or eliminate spatial non-uniformities across display regions on an electronic display.

Although discussed in terms of VR systems, the techniques for display device aging compensation described herein can be used with other devices having electronic displays in order to improve display uniformity.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
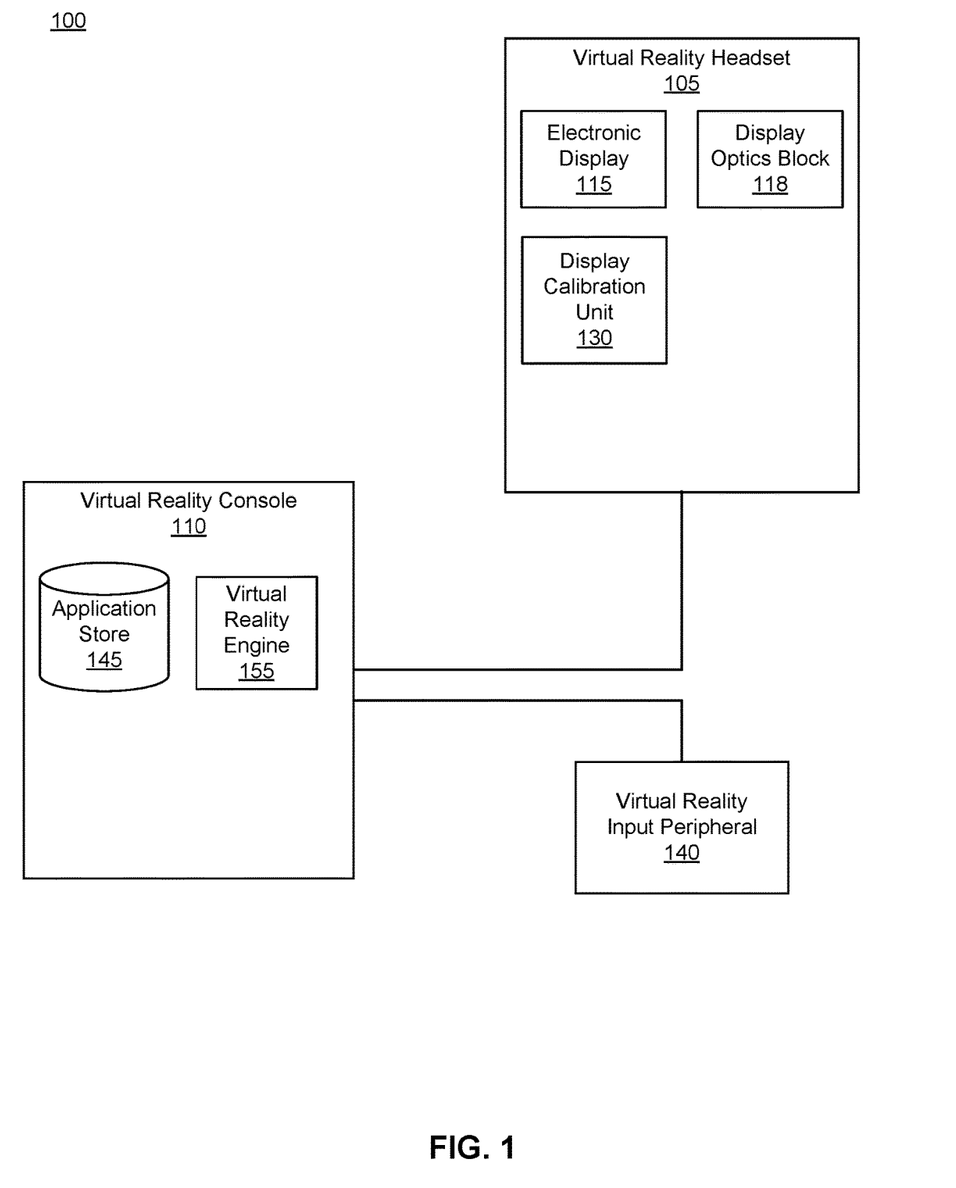
FIG. 1 is a block diagram of a system environment including a virtual reality system, in accordance with an embodiment.

FIG. 1 is a block diagram of a virtual reality (VR) system environment 100, in accordance with an embodiment. The VR system environment 100 shown by FIG. 1 comprises a VR headset 105 and a VR input peripheral 140 that are each coupled to the VR console 110. While FIG. 1 shows an example VR system environment 100 including one VR headset 105 and one VR input peripheral 140, any number of these components may be included in the VR system environment 100, or any of the components could be omitted. For example, there may be multiple VR headsets 105 controlled at least in part by one or more VR input peripherals 140 in communication with the VR console 110. In alternative configurations, different or additional components may be included in the VR system environment 100.

The VR headset 105 is a head-mounted display that presents content to a user. Examples of content presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIG. 2A and FIG. 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

In various embodiments, the VR headset 105 includes an electronic display 115, a display optics block 118, and a display calibration unit 130. The VR headset 105 may omit any of these elements or include additional elements in various embodiments. Additionally, in some embodiments, the VR headset 105 includes elements combining the function of various elements described in conjunction with FIG. 1.

The electronic display 115 (also referred to as a display panel) displays images to the user according to data received from the VR console 110. In various embodiments, the electronic display 115 may comprise one or more display panels such as a liquid crystal display (LCD), an LED display, an OLED display, an active-matrix OLED display (AMOLED), a transparent OLED display (TOLED), or some other display. The electronic display 115 may include sub-pixels to emit light of a predominant color such as red, green, blue, white, or yellow. In some embodiments, the electronic display 115 renders display frames using a display driver that supplies display data to pixels arranged in rows controlled by a gate driver. The electronic display 115 may display a three-dimensional (3D) image through stereo effects produced by two-dimensional (2D) panels to create a subjective perception of image depth. For example, the electronic display 115 includes a left display and a right display positioned in front of a user's left eye and right eye, respectively. The left and right displays present copies of an image shifted horizontally relative to each other to create a stereoscopic effect (i.e., a perception of image depth by a user viewing the image).

The display optics block 118 magnifies image light received from the electronic display 115, corrects optical errors associated with the image light, and presents the corrected image light to a user of the VR headset 105. In various embodiments the display optics block 118 includes one or more optical elements. Example optical elements include: an aperture, a Fresnel lens, a convex lens, a concave lens, a filter, or any other suitable optical element that affects image light emitted from the electronic display 115. The display optics block 118 may include combinations of different optical elements as well as mechanical couplings to maintain relative spacing and orientation of the optical elements in a combination. An optical element in the display optics block 118 may have an optical coating, such as an anti-reflective coating, or a combination of optical coatings.

Magnification of the image light by the display optics block 118 allows the electronic display 115 to be physically smaller, weigh less, and consume less power than larger displays. Additionally, magnification may increase a field of view of the displayed content. For example, the field of view of the displayed content is such that the displayed media is presented using almost all (e.g., 110 degrees diagonal) or all of the user's field of view. In some embodiments, the display optics block 118 has an effective focal length larger than the spacing between the display optics block 118 and the electronic display 115 to magnify image light projected by the electronic display 115. Additionally, the amount of magnification of image light by the display optics block 118 may be adjusted by adding or by removing optical elements from the display optics block 118.

The display optics block 118 may be designed to correct one or more types of optical error, such as two-dimensional optical errors, three-dimensional optical errors, or a combination thereof. Two-dimensional errors are optical aberrations that occur in two dimensions. Example types of two-dimensional errors include: barrel distortion, pincushion distortion, longitudinal chromatic aberration, and transverse chromatic aberration. Three-dimensional errors are optical errors that occur in three dimensions. Example types of three-dimensional errors include: spherical aberration, comatic aberration, field curvature, and astigmatism. In some embodiments, content provided to the electronic display 115 for display is pre-distorted, and the display optics block 118 corrects the distortion when it receives image light from the electronic display 115 generated based on the content.

The display calibration unit 130 corrects display data used to drive the electronic display 115. For example, the display calibration unit 130 improves the uniformity of a display property across the electronic display 115 or the consistency of the display property over time. A display property refers to as any measure of light emitted by the pixels and subpixels of the electronic display 115. Example display properties include luminance, color balance, contrast ratio, or response time. The display calibration unit 130 may determine correction values used to modify display data to improve uniformity of a display property. For example, the display calibration unit 130 modifies digital levels of display data or modifies driving voltage or driving current supplied to subpixels of the electronic display 115.

Figure 3:
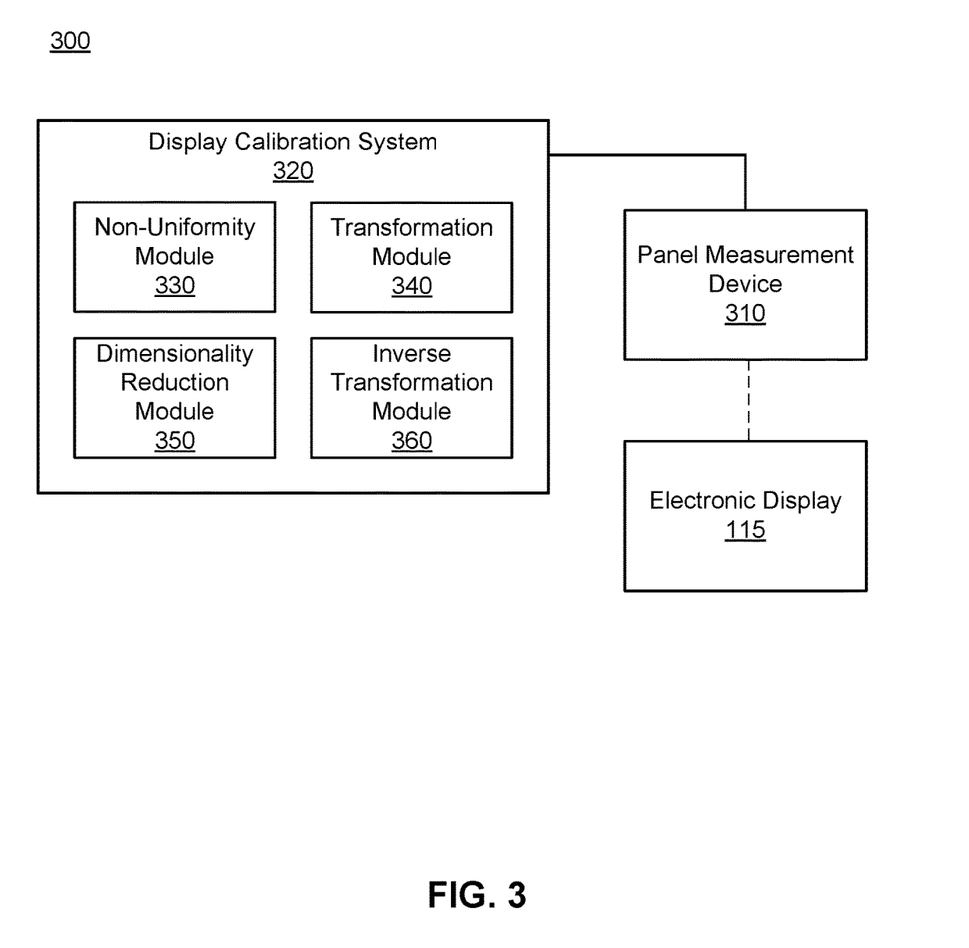
FIG. 3 is a block diagram of a calibration system environment for calibrating an electronic display, in accordance with an embodiment.
Figure 4:
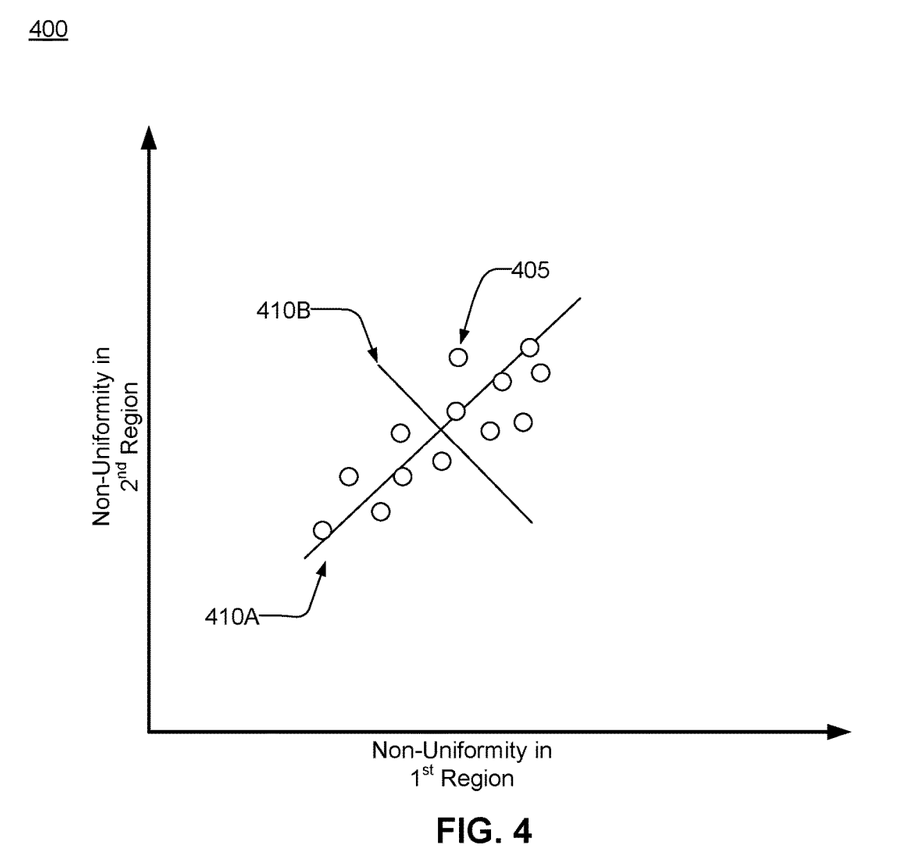
FIG. 4 is a conceptual diagram illustrating principal components of non-uniformity measured in two regions of a set of electronic displays, in accordance with an embodiment.

In one embodiment, the display calibration unit 130 generates the correction values from a non-uniformity representation having a reduced dimensionality. The display calibration unit 130 performs an inverse transformation to recover correction values corresponding to display regions of the electronic display 115 and uses the correction values to modify display data used to drive the corresponding display regions. FIGS. 3 and 4 describe the determination of the non-uniformity representation and inverse transformation in further detail. A display region includes contiguous pixels on the electronic display 115. A display region may include only subpixels within contiguous pixels that correspond to a particular color (i.e., range of wavelengths) such as red, green, blue, yellow, or white. Alternatively, the subpixels correspond to a subset or all of the color channels in a pixel. Some of the functionality described with respect to the display calibration unit 130 may be performed in combination with the virtual reality engine 155. The display calibration unit 130 is described further with respect to FIG. 5.

The VR input peripheral 140 is a device that allows a user to send action requests to the VR console 110. An action request is a request to perform a particular action. For example, an action request may be to start or to end an application or to perform a particular action within the application. The VR input peripheral 140 may include one or more input devices. Example input devices include: a keyboard, a mouse, a game controller, a glove, or any other suitable device for receiving action requests and communicating the received action requests to the VR console 110. An action request received by the VR input peripheral 140 is communicated to the VR console 110, which performs an action corresponding to the action request. In some embodiments, the VR input peripheral 140 may provide haptic feedback to the user in accordance with instructions received from the VR console 110. For example, the VR input peripheral 140 provides haptic feedback when an action request is received or when the VR console 110 communicates instructions to the VR input peripheral 140 causing the VR input peripheral 140 to generate haptic feedback when the VR console 110 performs an action. In some embodiments, the VR input peripheral 140 includes an external imaging device that tracks the position, orientation, or both the VR headset 105.

The VR console 110 provides media to the VR headset 105 for presentation to the user in accordance with information received from the VR headset 105 and the VR input peripheral 140. In the example shown in FIG. 1, the VR console 110 includes an application store 145 and a virtual reality (VR) engine 155. Some embodiments of the VR console 110 have different or additional modules than those described in conjunction with FIG. 1. Similarly, the functions further described below may be distributed among components of the VR console 110 in a different manner than is described here.

In some embodiments, the VR console 110 includes a processor and a non-transitory computer-readable storage medium storing instructions executable by the processor. The processor may include multiple processing units executing instructions in parallel. The computer-readable storage medium may be any memory such as a hard disk drive, a removable memory, or a solid-state drive (e.g., flash memory, dynamic random access memory (DRAM)). In various embodiments, the modules of the VR console 110 described in conjunction with FIG. 1 are encoded as instructions in the non-transitory computer-readable storage medium that, when executed by the processor, cause the processor to perform the functionality further described below.

The application store 145 stores one or more applications for execution by the VR console 110. An application is a group of instructions, that when executed by a processor, generates content for presentation to the user. Content generated by an application may be in response to inputs received from the user via movement of the VR headset 105 or of the VR input peripheral 140. Examples of applications include: gaming applications, conferencing applications, video playback application, or other suitable applications.

The VR engine 155 executes applications within the VR system environment 100 and receives input data from the VR peripheral 140 as well as tracking data. The tracking data includes position and orientation data of the VR headset 105, the VR input peripheral 140, or both. The tracking data may further include eye tracking data indicating the user's estimated or actual gaze point. Using the input data and tracking data, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input peripheral 140 and provides feedback to the user indicating that the action was performed. The feedback may be visual or audible feedback via the VR headset 105 or haptic feedback via the VR input peripheral 140. In some embodiments, the VR engine 155 performs some or all of the functionality of the display calibration unit 130.

VR Headset

Figure 2A:
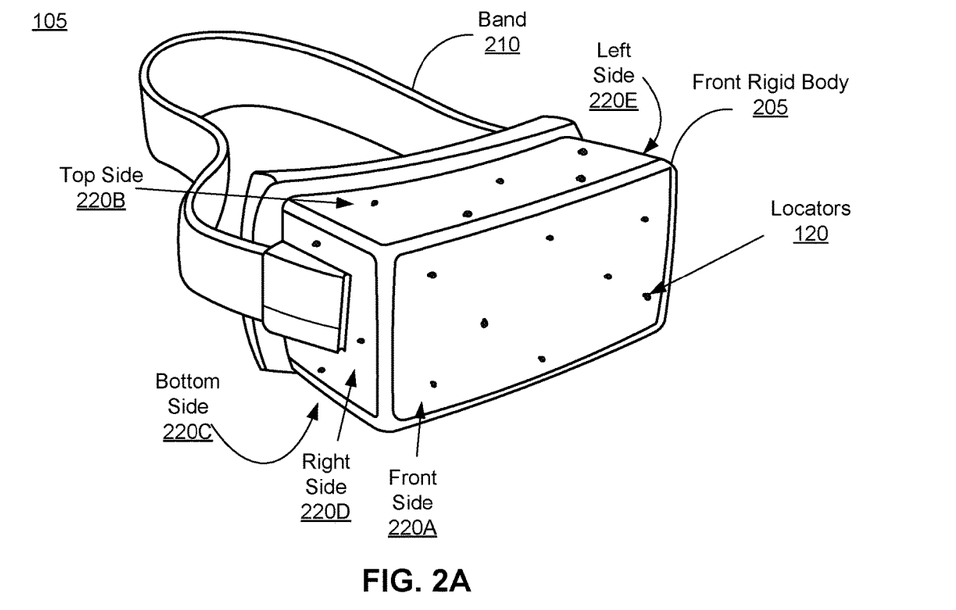
FIG. 2A is a diagram of a virtual reality headset, in accordance with an embodiment.

FIG. 2A is a diagram of one embodiment of the virtual reality (VR) headset 105. The VR headset 105 includes a front rigid body 205 and a band 210. The front rigid body 205 includes the electronic display 115 (not shown in FIG. 2A) and locators 120. In other embodiments, the VR headset 105 may include different or additional components than those depicted by FIG. 2A.

The locators 120 are located in fixed positions on the front rigid body 205 relative to one another. Each of the locators 120 emits light that is detectable by an external imaging device to enable tracking of the position and orientation of the VR headset 105. Locators 120, or portions of locators 120, are located on a front side 220A, a top side 220B, a bottom side 220C, a right side 220D, and a left side 220E of the front rigid body 205 in the example of FIG. 2A.

Figure 2B:
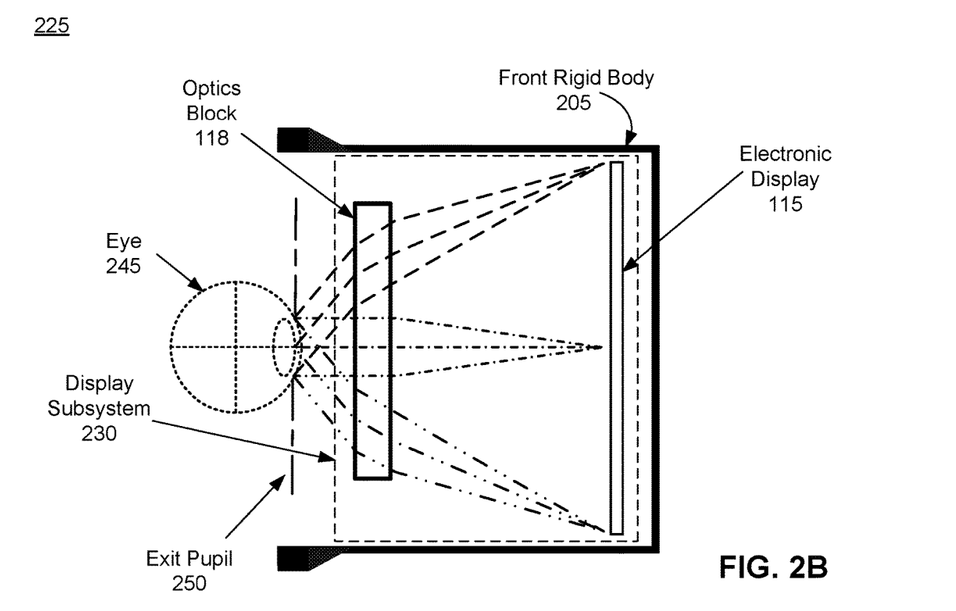
FIG. 2B is a cross-sectional view of a front rigid body of the VR headset in FIG. 2A, in accordance with an embodiment.

FIG. 2B is a cross section 225 of the front rigid body 205 of the embodiment of a VR headset 105 shown in FIG. 2A. As shown in FIG. 2B, the front rigid body 205 includes a display subsystem 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the display subsystem 230, may provide altered image light to another eye of the user.

The display subsystem 230 includes the electronic display 115 and the optics block 118. The electronic display 115 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

Display Calibration System

FIG. 3 is a block diagram of a calibration system environment 300 for calibrating an electronic display, in accordance with an embodiment. The calibration system environment 300 shown by FIG. 1 comprises a panel measurement device 310, which measures the display properties of one or more electronic displays 115, and a display calibration system 320 communicatively coupled to the panel measurement device 310. While FIG. 3 shows an example calibration system environment 300 including one display calibration system 320 and one panel measurement device 310, any number of these components may be included in the VR system environment 300. For example, the display calibration system 320 is communicatively coupled to multiple panel measurement devices 310.

The panel measurement device 310 measures display properties of an electronic display 115. Example panel measurement devices 310 include one or more photodetectors, two-dimensional imaging arrays, three-dimensional image arrays, photodiodes, or point measurement devices that produce an electrical signal in response to light. The electrical signal may represent luminance, emittance, intensity, or some other photometric measure. The photodetector may be sensitive to a particular portion of the electromagnetic spectrum. For example, the panel measurement device 310 may be sensitive to the visible spectrum or a portion thereof that corresponds to one or more colors emitted by subpixels. The panel measurement device 310 may include multiple sensors responsive to light from different portions of the visible spectrum. The panel measurement device 310 measures light corresponding to one or more contiguous pixels. In general, the panel measurement device 310 has a spatial resolution smaller than the dimension of the display regions. The photodetector of the panel measurement device 310 moves relative to the electronic display 115 (or vice versa) so that the panel measurement device 310 may measure variation in a display property across the display regions of electronic display 115.

The display calibration system 320 receives measured display properties from the panel measurement device 310. The display calibration system 320 converts the measured display properties to non-uniformity measures for an electronic display 115. Based on non-uniformity measures for a set of electronic displays 115, the display calibration system 320 generates a transformation to reduce the dimensionality of the non-uniformity measures. The transformation uses statistical correlations among the non-uniformity measures to represent the variation across the set of electronic displays 115 with fewer dimensions while maintaining at least a threshold proportion of information contained in the non-uniformity measures. The non-uniformity measures tend to be correlated for the set of electronic displays 115 when the set includes electronic displays from a particular manufacturing batch, factory, or manufacturer. The display calibration system 320 determines a non-uniformity representation from the non-uniformity measures of an electronic display 115 and stores the non-uniformity representation in a memory of the electronic display 115.

In some embodiments, the panel measurement device 310 measures display properties of a set of display subsystems 230, and the display calibration system 320 converts the display properties to non-uniformity measures of the display subsystems 230. The display calibration system 320 outputs non-uniformity representations for the individual display subsystems 230 as well as an inverse transformation for the set of display subsystems 230. In other words, the display calibration system 320 outputs calibration data used to correct spatial non-uniformities resulting from the electronic display 115, optics block 118, any other components in the display subsystem 230, and their assembly into the display subsystem 230. The set of display subsystems 230 may include display subsystems 230 having electronic displays 115 from the same set (e.g., batch, lot, or manufacturer), optics blocks 118 from the same set (e.g., batch, lot, or manufacturer), or the same combination of electronic display set and optics block set.

The display calibration system 320 may be a computer (e.g., server, desktop, laptop) having a memory and processor. The memory includes instructions for modules including a non-uniformity module 330, a transformation module 340, a dimensionality reduction module 350, and an inverse transformation module 360. In other embodiments, the display calibration system 320 may include a different combination of modules to perform at least some of the features described herein.

The non-uniformity module 330 determines non-uniformity measures for display regions of an electronic display 115 from the display properties received from the panel measurement device 310. In general, a display region corresponds to a contiguous region of pixels on the electronic display 115, although it could refer only to subpixels corresponding to one or more colors among the contiguous region of pixels. Various display region configurations are possible. For example, the electronic display 115 is divided into a grid of rectangular display regions, where the boundaries between display regions are parallel to the gate lines and data lines used to drive pixels. Example numbers of display regions in a row or column of the grid include five, ten, twenty, thirty, sixty, one hundred, or another number, so the electronic display 115 includes between twenty-five and ten thousand display regions. The display regions are defined consistently across the set of electronic displays 115.

The non-uniformity module 330 determines non-uniformity measures for a display region by comparing measurements of the display property for the display region to an overall average of the display property. The non-uniformity module 330 determines an average of the display property for a display region from an average of display properties measured for pixels within the display region. The average may be a weighted average or some other measure of central tendency. The non-uniformity module 330 determines an overall average of the display property for the particular electronic display 115 or for the set of electronic displays 115. Another measure of central tendency may be used in place of the overall average. To determine the non-uniformity measure of a display region, the non-uniformity module 330 determines a difference between the average of the display property determined for the display region and the overall average.

The transformation module 340 statistically analyzes the non-uniformity measures for display regions of the set of electronic displays 115 and determines a transformation to reduce the dimensionality of the non-uniformity measures. The transformation module 340 generally seeks to minimize the dimensionality of the non-uniformity measures while also minimizing information lost from the dimensionality reduction. Because these are opposing goals, the transformation module 340 may impose a constraint on one goal and optimize for the other goal. For example, the transformation module 340 maximizes information contained in a predetermined number of dimensions, or the transformation module 340 minimizes a number of dimensions to represent at least a threshold amount of information.

In one embodiment, the transformation module 340 determines the transformation using a form of principal component analysis such as the Karhunen-Loéve transformation, the Hotelling transformation, singular value decomposition, or eigenvalue decomposition. Principal component analysis concentrates variance contained along some transformed dimensions while minimizing variance contained in the other transformed dimensions. Accordingly, the dimensions that contain the least variance may be discarded without discarding significant information.

The transformation module 340 applies principal component analysis to a representation of the measures of non-uniformity for the set of electronic displays 115. For example, the transformation module 340 represents the measures of non-uniformity as a matrix X having columns corresponding to particular display regions and rows corresponding to particular electronic displays 115. The transformation module 340 generates an initial transformation matrix T from the non-uniformity measures X using a method such as singular value decomposition or eigenvalue decomposition of the covariance of the non-uniformity measures.

For example, the transformation module 340 performs the singular value decomposition of X according to Equation 1:

$$X = U\Sigma W^T$$

where U is a matrix containing the left-singular vectors of X, $\Sigma$ is a diagonal matrix containing the singular values of X, and W is a matrix containing the right-singular vectors of X and also serves as the initial transformation matrix T.
The initial transformation contains basis vectors (e.g., columns of matrix W) corresponding to the principal components of the non-uniformity measures. The singular values of the non-uniformity measures (e.g., the diagonal values of $\Sigma$) are measures of variance contained along corresponding basis vectors.

Alternatively or additionally, the transformation module 340 determines the initial transformation from the covariance of the non-uniformity measures. For example, the transformation module 340 determines the covariance matrix C according to Equation 2:

$$C = 1/n - X^T X$$

where n is the number of electronic displays 115 in the set. The transformation module 340 determines the initial transformation from the eigenvectors of the covariance matrix C, such that the initial transformation T satisfies Equation 3:

$$T^{-1} C T = D$$

where D is a diagonal matrix containing the eigenvalues of the covariance matrix C. The eigenvectors of the covariance matrix (e.g., columns of T) are basis vectors corresponding to the principal components of the non-uniformity measures. The eigenvalues of the covariance matrix (e.g., diagonal values of D) are measures of variance along corresponding basis vectors.

The initial transformation changes the coordinates of the non-uniformity measures without discarding any information, so the non-uniformity measures may be recovered from the initial transformation. The transformation module 340 determines the dimensionality reduction transformation by discarding basis vectors from the initial transformation. The transformation module 340 determines measures of variance along the basis vectors. For example, the transformation module 340 determines the measures of variance from singular values of the non-uniformity measures (e.g., contained in $\Sigma$) or eigenvalues of the non-uniformity measures (e.g., contained in D). In general, the transformation module 340 selects basis vectors that maximize the measures of variance when the non-uniformity measures are projected onto a subspace spanned by the selected basis vectors.

In one embodiment, the transformation module 340 ranks the basis vectors (i.e., columns of T) by corresponding measures of variance and selects basis vectors according to the ranking. For example, the transformation module 340 selects a predetermined number of the top-ranking basis vectors. As another example, the transformation module 340 repeatedly selects basis vectors having decreasing measures of variance until a cumulative measure of variance in the selected basis vectors exceeds a threshold measure of variance. The transformation module 340 outputs the transformation containing the selected subset of the basis vectors. For example, the transformation matrix $T_R$ contains the columns of T that correspond to the selected basis vectors.

The dimensionality reduction module 350 applies the transformation to non-uniformity measures of an electronic display 115 to generate a non-uniformity representation for that electronic display 115. The transformation reduces the dimensionality of the non-uniformity measures from the number of display regions to the number of selected basis vectors. For example, the number of display regions is thirty-six hundred (e.g., for a sixty-by-sixty grid of display regions) and the selected number of basis vectors is ten, so the non-uniformity representation has ten entries. If the non-uniformity measures are represented as a row vector x, the dimensionality reduction module 350 generates the non-uniformity representation r according to Equation 4:

$$r = x T_R$$

Alternatively or additionally, the dimensionality reduction module 350 may determine the non-uniformity representations R for the set of electronic displays 115. For example, the dimensionality reduction module 350 determines R using the singular value decomposition of X according to Equation 5:

$$R = U_R \Sigma_R$$

where $U_R$ contains the left-singular vectors corresponding to the selected basis vectors, and $\Sigma_R$ contains the singular values corresponding to the selected basis vectors. A row of R corresponds to the non-uniformity representation of a particular electronic display 115.

The dimensionality reduction module 350 stores the non-uniformity representation in a memory of the corresponding electronic display 115. For example, the dimensionality reduction module 350 stores the non-uniformity representation in a register of the electronic display 115, which may include other calibration data or settings for the electronic display 115. Alternatively or additionally, the non-uniformity representation is stored in a memory (e.g., flash memory) of the VR headset 105 containing the electronic display 115, a memory of the VR console 110 communicatively coupled to the VR headset 105, or another memory accessible by the VR console 110 (e.g., cloud storage). Because the non-uniformity representation has relatively few dimensions (e.g., five to thirty) relative to the number of display regions, the non-uniformity representation significantly reduces memory to store calibration data. In particular, the non-uniformity representation obviates a dedicated register to contain the non-uniformity measures, which reduces the power consumption, physical size, and manufacturing cost of the electronic display 115.

The inverse transformation module 360 determines an inverse transformation for converting the non-uniformity representation to correction values for the display regions. The inverse transformation module 360 determines the inverse transformation B according to Equation 6:

$$B = R_R^{-1}$$

In some embodiments, the transformation is orthogonal. Accordingly, the inverse transformation B corresponds to the transpose of $T_R$.

The inverse transformation module 360 stores the inverse transformation in a memory accessible by a VR headset 105 containing the electronic display 115 or the VR console 110 communicatively coupled to the VR headset 105. For example, the inverse transformation module 360 stores the inverse transformation in cloud storage accessible by the VR console 110. As another example, the inverse transformation module 360 stores the inverse transformation in a memory of the VR console 110.

Although described with respect to principal component analysis, the display calibration system 320 may determine the transformation, inverse transformation, and non-uniformity representations using other dimensionality reduction techniques such as canonical correlation analysis or zero-phase component analysis.

FIG. 4 is a conceptual diagram 400 illustrating principal components of non-uniformity measured in two regions of a set of electronic displays 115, in accordance with an embodiment. The diagram 400 illustrates non-uniformity measures 405 for the set of electronic displays 115 for a first display region and a second display region. The transformation module 340 may perform principal component analysis on the non-uniformity measures to identify basis vectors 410A and 410B as part of the initial transformation. In the illustrated example, more variation occurs along the basis vector 410A than the basis vector 410B. Thus, the transformation module 340 selects the first basis vector 410A for inclusion in the dimensionality reduction transformation while omitting basis vector 410B. During reconstruction, variance along the basis vector 410B is lost, so the reconstructed non-uniformity measures are projections of the non-uniformity measures onto basis vector 410A.

Display Calibration Unit

Figure 5:
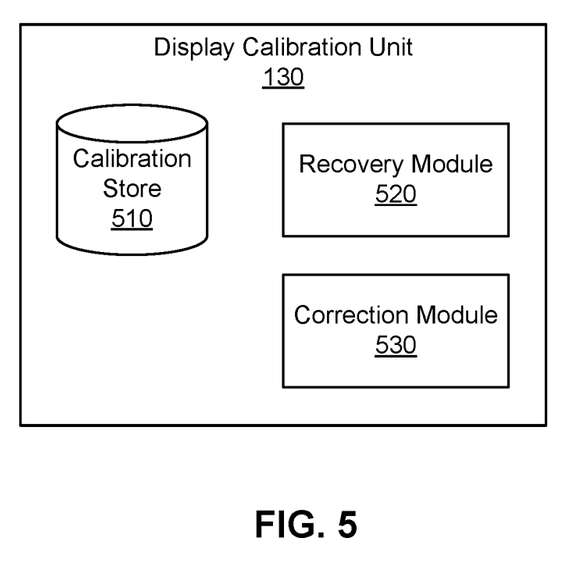
FIG. 5 is a block diagram of a display calibration unit, in accordance with an embodiment.

FIG. 5 is a block diagram of a display calibration unit 130, in accordance with an embodiment. The display calibration unit 130 includes calibration store 510, recovery module 520, and correction module 530. In other embodiments, the display calibration unit 130 may include a different combination of modules to perform at least some of the features described herein.

The calibration store 510 contains calibration data including at least the inverse transformation. For example, the inverse transformation is a matrix B having a number of rows equal to the dimensionality of the non-uniformity representation and a number of columns equal to the number of display regions of the electronic display 115. The calibration store 510 may further contain the non-uniformity representation corresponding to the electronic display 115. Alternatively or additionally, the non-uniformity representation is contained in a register or other memory of the electronic display 115.

The recovery module 520 generates correction values for the display regions by accessing the inverse transformation and the non-uniformity representation. The recovery module 520 accesses non-uniformity representation (e.g., from a register of the electronic display 115) and the inverse transformation (e.g., from cloud storage accessible by the VR headset 105, the VR console 110, or both. The recovery module 520 generates the correction values by applying the inverse transformation to the non-uniformity representation. For example, the recovery module 520 generates a row vector of the correction values y according to Equation 7:

$$y = rB = rT_R^{-1}$$

The correction values y correspond to approximate deviations of the display regions in a display property from an overall average value of the display property. The correction values y do not perfectly reconstruct the non-uniformity measures, but the correction values are accurate enough to compensate for non-uniformities in the electronic display 115.

The correction module 530 applies non-uniformity compensation to subpixels and pixels of the electronic display 115 according to the correction values determined by the recovery module 520. To apply non-uniformity compensation for a subpixel, the correction module 530 identifies which display region contains the subpixel. The correction module 530 combines the display data for the subpixel with the correction value for the identified display region to determine modified display data to drive the subpixel. For example, the correction module 530 modifies the digital level of the display data according to the correction value. Since the correction value may be in terms of a display property (e.g., luminance), the correction module 530 may access a mapping (e.g., lookup table) between the display property and digital levels to determine a correction digital level (which may be positive, negative, or zero) to add to the digital level of the display data. As another example, the correction module 530 determines a driving voltage correction corresponding to the correction value and modifies the driving voltage corresponding to the display data with the driving voltage correction. As another example, the correction module 530 determines a driving current correction corresponding to the correction value and modifies the driving current corresponding to the display data with the driving current correction.

In some embodiments, a correction value corresponds to a deviation in luminance of pixels in a display region from the overall average luminance of pixels in the electronic display 115. Accordingly, the correction module 530 increases or decreases digital levels of pixels in display regions having less luminance or more luminance, respectively, than the overall average luminance. In some embodiments, a correction value corresponds to deviations in a color's prevalence from the color's overall prevalence across the electronic display 115. Accordingly, the correction module 530 increases or decreases digital levels of subpixels for the color in display regions where the color has less prevalence or more prevalence, respectively, than the color's average prevalence across the electronic display 115. Alternatively or additionally, the correction module 530 modifies digital levels of subpixels for other colors to correct color balance.

In some embodiments, the functions of the display calibration unit 130 are performed in whole or in part by the VR console 110. For example, the display calibration unit 130 accesses the inverse transformation in cloud storage using a network adapter of the VR console 110. As another example, the VR headset 105 accesses the non-uniformity data from the electronic display 115 and sends the non-uniformity data to the VR console 110, which determines correction values, modifies display data according to the correction values, and sends the modified display data to the VR headset 105. As a third example, the VR engine 155 performs some or all of the functionality described with respect to the correction module 530.

Calibrating an Electronic Display

Figure 6:
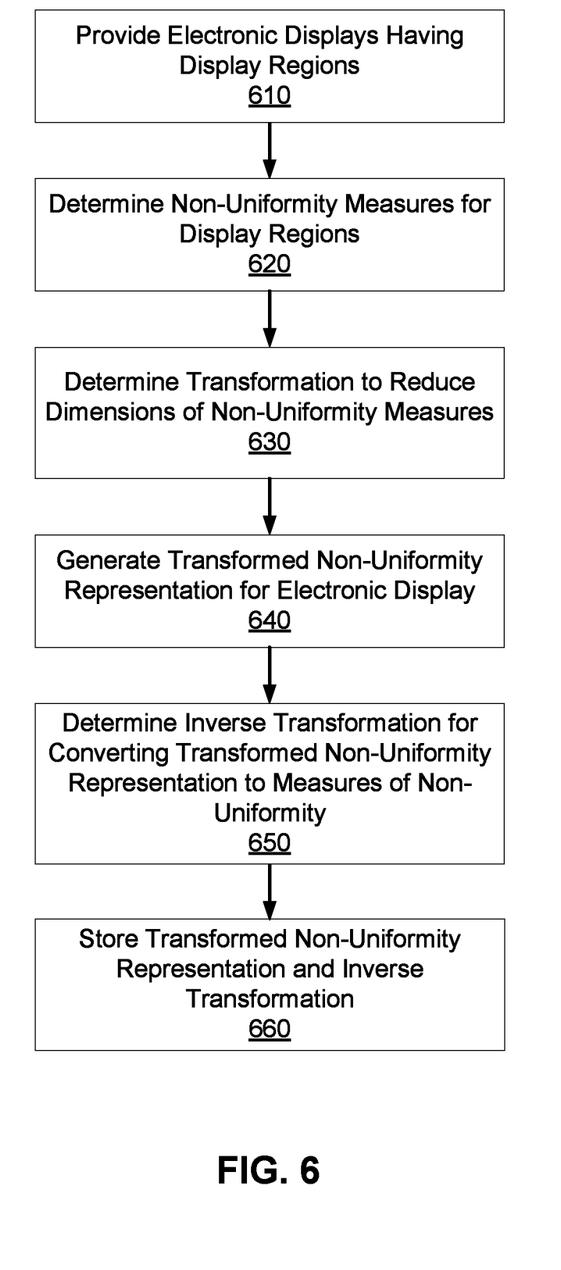
FIG. 6 is a flowchart of an example process for calibrating an electronic display, in accordance with an embodiment.

FIG. 6 is a flowchart of an example process for calibrating an electronic display, in accordance with an embodiment. In some embodiments, the method may include different and/or additional steps than those described in conjunction with FIG. 6. Additionally, in some embodiments, the method may perform the steps in different orders than the order described in conjunction with FIG. 6.

The display calibration system 320 provides 610 a set of electronic displays 115 each including display regions, which include a set of contiguous pixels. The display regions are defined consistently across the set of electronic displays 115. The display calibration system 320 determines 620 non-uniformity measures for the display regions of the set of electronic displays 115 (e.g., by the non-uniformity module 330). For example, the display calibration system determines 620 luminance or color balance for the display regions according to display properties output by the panel measurement device 310.

The display calibration system 320 determines 630 a transformation for converting the non-uniformity measures to transformed non-uniformity representations having fewer dimensions than a total number of the display regions in an electronic display (e.g., by the transformation module 340). The display calibration system 320 generates 640 the transformed non-uniformity representation for the electronic display 115 based on the determined transformation (e.g., by the dimensionality reduction module 350). For example, the display calibration system 320 applies principal component analysis to determine 630 the transformation and to generate 640 the transformed non-uniformity representation. The display calibration system 320 determines 650 an inverse transformation for converting the transformed non-uniformity representation to correction values for the display regions (e.g., by the inverse transformation module 360).

The display calibration system 320 stores 660 the transformed non-uniformity representation and the determined inverse transformation in association with the electronic display 115. For example, the display calibration system 320 stores 660 the non-uniformity representation in a register of the electronic display 115 and the determined inverse transformation in a cloud server accessible by a VR headset 105 including the electronic display 115. As another example, the display calibration system 320 stores the non-uniformity representation, the inverse transformation, or both in a non-volatile memory of the VR headset 105.

Electronic Display Driving According to Calibration Data

Figure 7:
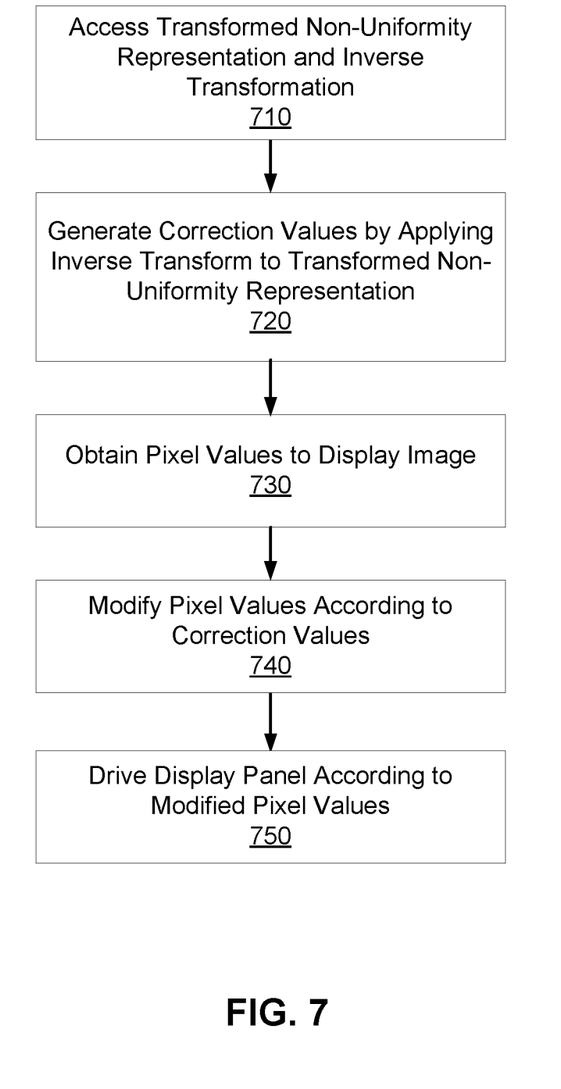
FIG. 7 is a flowchart of an example process for driving an electronic display according to stored calibration data, in accordance with an embodiment.

FIG. 7 is a flowchart of an example process for driving an electronic display according to stored calibration data, in accordance with an embodiment. In some embodiments, the method may include different and/or additional steps than those described in conjunction with FIG. 7. Additionally, in some embodiments, the method may perform the steps in different orders than the order described in conjunction with FIG. 7. Moreover, although described with respect to the VR headset 105, some or all of illustrated steps may be performed by the VR console 110 (e.g., by the VR engine 155) or in conjunction with the VR console 110.

The VR headset 105 accesses 710 a transformed non-uniformity representation and an inverse transformation. For example, the VR headset 105 accesses the transformed non-uniformity representation from a register or cache of the VR headset 105 or the electronic display. Alternatively, the VR headset 105 accesses the transformed non-uniformity representation from the VR console 110 or cloud storage. The VR headset 105 may access the inverse transformation associated with the set of electronic displays 115 including the electronic display 115 from cloud storage, for example. Alternatively, the VR headset 105 accesses the transformed non-uniformity representation from the VR console 110 or cloud storage. The VR headset 105 generates 720 correction values by applying the inverse transformation to the transformed non-uniformity representation (e.g., by the recovery module 520). The correction values correspond to a plurality of display regions on the electronic display 115. A display region includes a pre-defined set of contiguous pixels on the electronic display 115.

The VR headset 105 obtains 730 display data for the electronic display 115. The VR headset 105 modifies 740 the display data according to the generated correction values and the display regions corresponding to the display data (e.g., by the correction module 530). For example, the VR headset 105 modifies digital levels of the display data by increasing or decreasing the digital levels according to the correction values to improve uniformity of luminance across the electronic display 115. The VR headset 105 drives 750 the electronic display 115 according the modified display data. For example, the VR headset 105 drives the pixels of the electronic display according to the modified display data. As another example, the VR headset 105 modifies drive currents corresponding to the input display data (e.g., in a gamma correction look-up table) according to the correction values.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   providing a set of electronic displays each comprising a plurality of display regions, a display region comprising a set of contiguous pixels, the display region defined consistently across the set of electronic displays;
   determining non-uniformity measures corresponding to the display regions of the set of electronic displays, wherein the non-uniformity measure corresponding to each display region of an electronic display of the set of electronic displays indicates a difference between an average of a display property of the respective display region and an overall average of the display property for the electronic display;
   determining a transformation for converting the non-uniformity measures to transformed non-uniformity representations having fewer dimensions than a total number of the display regions in an electronic display of the set of electronic displays;
   generating a transformed non-uniformity representation for the electronic display from the determined non-uniformity measures based on the determined transformation, the non-uniformity representation having fewer dimensions than the total number of display regions in the electronic display;
   determining an inverse transformation for converting the transformed non-uniformity representation to correction values for the display regions; and
   storing the transformed non-uniformity representation and the determined inverse transformation in association with the electronic display.

2. The method of claim 1, wherein determining the transformation comprises determining basis vectors that maximize variance in the non-uniformity measures projected onto a subspace spanned by the determined basis vectors.

3. The method of claim 1, wherein determining the transformation comprises:
   determining basis vectors corresponding to principal components of the non-uniformity measures;
   determining a measure of variance in the non-uniformity measure along each basis vector;
   ranking the basis vectors by the determined measures of variance for each basis vector; and
   determining the transformation comprising a subset of the basis vectors selected according to the ranking of the basis vectors.

4. The method of claim 3,
   wherein determining the basis vectors comprises determining eigenvectors from a covariance of the non-uniformity measures, and
   wherein determining the measure of variance along each basis vector comprises determining eigenvalues of the covariance matrix.

5. The method of claim 3,
   wherein determining the basis vectors comprises determining the basis vectors from a singular value decomposition of the non-uniformity measures, and
   wherein determining the measure of variance along each basis vector comprises determining singular values from the singular value decomposition that correspond to each basis vector.

6. The method of claim 3, wherein determining the transformation comprising the subset of the basis vectors includes:
   determining a cumulative variance for each basis vector by summing a measure of variance for that basis vector with measures of variance for basis vectors ranked higher than that basis vector;
   comparing the cumulative variances to a threshold cumulative variance; and
   responsive to a cumulative variance of one basis vector exceeding the threshold cumulative variance, selecting the one basis vector and basis vectors ranking higher than the one basis vector for inclusion in the selected subset of basis vectors.

7. The method of claim 1, wherein determining the non-uniformity measure for each display region comprises:
   determining the average of the display property in each display region using a photodetector;
   determining the overall average of the display property for the electronic display; and
   determining the non-uniformity measure for each display region by subtracting the overall average of the display property from the determined average of the display property for each display region.

8. The method of claim 1, wherein the plurality of display regions are a rectangular grid of display regions having between 20 and 100 regions along a horizontal edge of the electronic display and between 20 and 100 regions along a vertical edge of the electronic display.

9. The method of claim 1, wherein storing the transformed non-uniformity representation and the determined inverse transformation in association with the electronic display comprises:
   storing the transformed non-uniformity representation in a register of the electronic display; and
   storing the determined inverse transformation in a memory accessible by a console providing display data for the electronic display.

10. A display system comprising:
    an electronic display having a plurality of display regions, each display region comprising a pre-defined set of contiguous pixels on the electronic display;
    a processor; and
    a non-transitory computer readable storage medium having instructions encoded thereon that, when executed by the processor, cause the processor to:
      access a transformed non-uniformity representation and an inverse transformation, the transformed non-uniformity representation determined via a transformation of a set of non-uniformity measures determined for a set of electronic displays comprising the electronic display, wherein the non-uniformity measure corresponding to each display region of the electronic display indicates a difference between an average of a display property of the respective display region and an overall average of the display property for the electronic display, wherein the transformed non-uniformity representation has fewer dimensions that the number of display regions in the electronic display;
      generate correction values by applying the inverse transformation to the transformed non-uniformity representation, the correction values corresponding to the plurality of display regions on the electronic display; and
      obtain display data for the electronic display;
      modify the display data according to the generated correction values and the display regions corresponding to the display data; and driving the electronic display according the modified display data.

11. The display system of claim 10, wherein accessing the transformed non-uniformity representation and the determined inverse transformation comprises:
accessing the transformed non-uniformity representation from a register of the electronic display; and
accessing the determined inverse transformation from a memory accessible by a console providing the display data.

12. The display system of claim 10, wherein the inverse transformation corresponds to an inverse of a transformation comprising basis vectors that are a subset of basis vectors corresponding to principal components of the set of non-uniformity measures.

13. The display system of claim 12, wherein the basis vectors correspond to at least a threshold proportion of variance in the non-uniformity measures for the set of electronic displays.

14. The display system of claim 10, wherein the correction values correspond to deviations in luminance of pixels from an overall average luminance of pixels in the electronic display, wherein modifying the display data comprises:
increasing digital levels of pixels in display regions having less luminance than the overall average luminance; and
decreasing digital levels of pixels in display regions having more luminance than the overall average luminance.

15. The display system of claim 10, wherein the correction values correspond to deviations in a color's prevalence from the color's overall prevalence across the electronic display, wherein modifying the display data comprises:
increasing digital levels of subpixels for the color in display regions where the color has less prevalence than the color's overall average prevalence across the electronic display; and
decreasing digital levels of subpixels for the color in display regions where the color has more prevalence than the color's average prevalence across the electronic display.

16. The display system of claim 10, wherein the plurality of display regions are a rectangular grid of display regions having between 20 and 100 display regions along a horizontal edge of the electronic display and between 20 and 100 display regions along a vertical edge of the electronic display.

17. A non-transitory computer readable storage medium having instructions encoded thereon that, when executed by the processor, cause the processor to:
provide a set of electronic displays each comprising a plurality of display regions, a display region comprising a set of contiguous pixels, the display region defined consistently across the set of electronic displays;
determine non-uniformity measures corresponding to the display regions of the set of electronic displays, wherein the non-uniformity measure corresponding to each display region of an electronic display of the set of electronic displays indicates a difference between an average of a display property of the respective display region and an overall average of the display property for the electronic display;
determine a transformation for converting the non-uniformity measures to transformed non-uniformity representations having fewer dimensions than a total number of the display regions in an electronic display of the set of electronic displays;
generate a transformed non-uniformity representation for the electronic display from the determined non-uniformity measures based on the determined transformation, the non-uniformity representation having fewer dimensions than the total number of display regions in the electronic display;
determine an inverse transformation for converting the transformed non-uniformity representation to correction values for the display regions; and
store the transformed non-uniformity representation and the determined inverse transformation in association with the electronic display.

18. The medium of claim 17, wherein determining the transformation comprises determining basis vectors that maximize variance in the non-uniformity measures projected onto a subspace spanned by the determined basis vectors.

19. The medium of claim 17, wherein determining the transformation comprises:
determining basis vectors corresponding to principal components of the non-uniformity measures;
determining a measure of variance in the non-uniformity measure along each basis vector;
ranking the basis vectors by the determined measures of variance for each basis vector; and
determining the transformation comprising a subset of the basis vectors selected according to the ranking of the basis vectors.

20. The medium of claim 17, wherein storing the transformed non-uniformity representation and the determined inverse transformation in association with the electronic display comprises:
storing the transformed non-uniformity representation in a register of the electronic display; and
storing the determined inverse transformation in a memory accessible by a console providing display data for the electronic display.

* * * * *